United States Patent
Zhang et al.

(10) Patent No.: US 12,071,356 B2
(45) Date of Patent: Aug. 27, 2024

(54) POSITIVE ELECTRODE MATERIAL HAVING MULTI-CAVITY STRUCTURE AND PREPARATION METHOD THEREFOR, AND LITHIUM ION BATTERY

(71) Applicant: Beijing Easpring Material Technology Co., Ltd., Beijing (CN)

(72) Inventors: Yongqiang Zhang, Beijing (CN); Liguo Sun, Beijing (CN); Xuequan Zhang, Beijing (CN); Yafei Liu, Beijing (CN); Yanbin Chen, Beijing (CN)

(73) Assignee: Beijing Easpring Material Technology Co., Ltd, Beijing (CN)

( * ) Notice: Subject to any disclaimer, the term of this patent is extended or adjusted under 35 U.S.C. 154(b) by 0 days.

(21) Appl. No.: 18/032,662

(22) PCT Filed: May 11, 2022

(86) PCT No.: PCT/CN2022/092146
§ 371 (c)(1),
(2) Date: Apr. 19, 2023

(87) PCT Pub. No.: WO2022/237823
PCT Pub. Date: Nov. 17, 2022

(65) Prior Publication Data
US 2023/0382762 A1    Nov. 30, 2023

(30) Foreign Application Priority Data
Dec. 23, 2021    (CN) .......................... 202111620078.X

(51) Int. Cl.
*C01G 53/00* (2006.01)
*H01M 4/131* (2010.01)
(Continued)

(52) U.S. Cl.
CPC ............ *C01G 53/50* (2013.01); *H01M 4/131* (2013.01); *H01M 4/1391* (2013.01);
(Continued)

(58) Field of Classification Search
CPC ..... H01M 2004/021; H01M 2004/028; H01M 4/0471; H01M 4/131; H01M 4/1391;
(Continued)

(56) References Cited

U.S. PATENT DOCUMENTS

| | | | |
|---|---|---|---|
| 10,020,507 B2 | 7/2018 | Kobayashi et al. | |
| 2015/0155548 A1* | 6/2015 | Ryoshi | C01G 53/40 429/223 |

(Continued)

FOREIGN PATENT DOCUMENTS

| | | |
|---|---|---|
| CN | 103797623 A | 5/2014 |
| CN | 110697799 A | 1/2020 |

(Continued)

OTHER PUBLICATIONS

International Search Report for PCT/CN2022/092146 dated Sep. 7, 2022 (PCT/ISA/210).
(Continued)

*Primary Examiner* — Brittany L Raymond
(74) *Attorney, Agent, or Firm* — Sughrue Mion, PLLC

(57) ABSTRACT

The present disclosure relates to the technical field of positive electrode materials of lithium ion batteries. Disclosed a positive electrode material having a multi-cavity structure and a preparation method therefor, and a lithium ion battery. The positive electrode material is formed by aggregation of a plurality of primary particles, and some of the primary particles grow in an oriented manner to form supporting structures, the supporting structures overlapping each other inside the positive electrode material to form a plurality of cavities. The particle strength of the positive
(Continued)

electrode material is significantly improved, so that the positive electrode material has the advantage of a long service life. In addition, the impedance of the positive electrode material is reduced, thereby improving the power performance of the positive electrode material.

10 Claims, 3 Drawing Sheets

(51) Int. Cl.
H01M 4/1391 (2010.01)
H01M 4/505 (2010.01)
H01M 4/525 (2010.01)
H01M 10/0525 (2010.01)

(52) U.S. Cl.
CPC ........... H01M 4/505 (2013.01); H01M 4/525 (2013.01); H01M 10/0525 (2013.01); C01P 2004/51 (2013.01); C01P 2004/62 (2013.01); C01P 2006/40 (2013.01)

(58) Field of Classification Search
CPC ...... H01M 4/505; H01M 4/525; C01G 53/50; C01P 2004/45; C01P 2004/51; C01P 2004/62
See application file for complete search history.

(56) References Cited

U.S. PATENT DOCUMENTS

2017/0133677 A1* 5/2017 Ryoshi .................. H01M 4/525
2019/0372090 A1* 12/2019 Sugiura ................. H01M 4/525

FOREIGN PATENT DOCUMENTS

| CN | 110931772 A | 3/2020 |
| CN | 112928250 A | 6/2021 |
| CN | 113461069 A | 10/2021 |
| CN | 114678519 A | 6/2022 |
| JP | 2017-016927 A | 1/2017 |
| JP | 2020-119785 A | 8/2020 |
| JP | 2020-177860 A | 10/2020 |
| WO | 2014/061399 A1 | 4/2014 |

OTHER PUBLICATIONS

Written Opinion for PCT/CN2022/092146 dated Sep. 7, 2022 (PCT/ISA/237).
Chinese Patent Office, Communication issued Mar. 21, 2023 in counterpart Chinese Application No. 202111620078.X.
Chinese Patent Office, Communication issued Sep. 26, 2023 in counterpart Chinese Application No. 202111620078.X.
Chinese Patent Office, Notification to Grant Patent issued Dec. 20, 2023 in counterpart Chinese Application No. 202111620078.X.

* cited by examiner

POSITIVE ELECTRODE MATERIAL HAVING MULTI-CAVITY STRUCTURE AND PREPARATION METHOD THEREFOR, AND LITHIUM ION BATTERY

CROSS REFERENCE TO RELATED APPLICATIONS

This application is a National Stage of International Application No. PCT/CN2022/092146, filed May 11, 2022, claiming priority based on Chinese patent application No. 202111620078.x, filed on Dec. 23, 2021, entitled "Positive Electrode Material Having Multi-cavity Structure and Preparation Method therefor, and Lithium Ion Battery", the contents of which is specifically and entirely incorporated herein by reference.

FIELD

The present disclosure relates to the technical field of positive electrode materials of lithium ion batteries, and particularly to a positive electrode material having a multi-cavity structure and a preparation method therefor and a lithium ion battery.

BACKGROUND

Along with the rapid development of automobile industry and the constantly increasing quantity of running vehicles in the world, the consumption of the non-renewable fossil fuel petroleum has been increased, and heavy emission of automobile exhaust has also caused heavy environmental pollution. The new energy vehicles using lithium ion batteries have attracted widespread attention from the people in recent years due to their effects of alleviating dependence on fossil fuel and reducing environmental pollution.

The electric vehicle (EV) has the defects of short endurance mileage and excessively long charge time at present, and cannot meet the consumer demand. The Hybrid Electric Vehicle (HEV) and Plug-in Hybrid Electric Vehicle (PHEV) can use both an internal combustion engine of a conventional vehicle and an electric motor of an electric vehicle as the power, combine the advantages of the fuel vehicle and the electric vehicle, thus the vehicles have been favored by the market, and has won vigorous development in recent years.

The HEV and PHEV impose high requirements on the instantaneous power output from the battery, thus the lithium ion positive electrode material must also exhibit the high power output characteristics. In order to increase the power output of the positive electrode material, it is necessary to enlarge the contact area between the material and the electrolyte as far as possible, so as to reduce the migration distance of $Li^+$ during the charge and discharge process. Decreasing the grain size of the material may increase the contact area of the material with the electrolyte, but too small grain size of the material results in excessive fine powder generated during the charge and discharge process, thereby deteriorating service life of the material.

CN106450278A discloses a ternary positive electrode material with a hollow microsphere structure, a preparation method and a use therefor, the invention improves properties of the positive electrode material with a hollow structure by preparing the positive electrode material so as to increase the contact area of the material with the electrolyte. Although the positive electrode material with a hollow structure can improve the power performance to some extent, the strength of the materials will be deteriorated. On the one hand, the low strength causes the material to be fractured and pulverized during the rolling process for fabricating a pole piece of the battery, resulting in a sharp decline in the service life and storage performance of the material; on the other hand, during the charge and discharge process, particularly the charge and discharge process at large multiplying power, the material may undergo sharp expansion and contraction, causing further deterioration in strength, and finally lead to pulverization of the material, thus the cycle service life deteriorates rapidly.

CN112242516B discloses a lithium ion battery ternary positive electrode material, which is loose and porous inside, the space between primary particles at the outside is large, and there is a part of penetration holes to reach the inside of particles. The material having a loose and porous structure and through holes exhibits a large specific surface area, although the material can increase the contact area with electrolyte and reduce the reaction resistance of the material, the loose and porous structure has poor strength under pressure and is prone to pulverize and deform, thus the performance is deteriorated during a process of fabricating batteries with the positive electrode material. Therefore, the ternary positive electrode material cannot exhibit the two characteristics of high performance and long service life.

As a result, it is significantly important to research and develop a positive electrode active material having a high strength.

SUMMARY

The present disclosure aims to overcome the defects and problems in the prior art that the poor strength of the positive electrode material, which in turn leads to low cycle service life of the positive electrode material, and provides a positive electrode material having a multi-cavity structure, a preparation method thereof and an lithium ion battery, the particle strength of the positive electrode material is significantly improved so that the positive electrode material has the advantage of long service life; moreover, the impedance of the positive electrode material is decreased, thereby improving the power performance of the positive electrode material.

In order to fulfill the purpose, a first aspect of the present disclosure provides a positive electrode material having a multi-cavity structure, wherein the positive electrode material is formed by aggregation of a plurality of primary particles, and some of the primary particles grow in an oriented manner to form supporting structures, the supporting structures overlap each other inside the positive electrode material to form a plurality of cavities.

A second aspect of the present disclosure provides a method of preparing the aforementioned positive electrode material includes:

(1) mixing an aqueous solution containing soluble salts of Ni, Co and Mn, a complexing agent and a precipitant, and subjecting the mixture to a co-precipitation reaction under protection of an inert gas, in order to obtain a $Ni_{1-x-y}Co_xMn_y(OH)_2$ hydroxide precursor; wherein a core of the $Ni_{1-x-y}Co_xMn_y(OH)_2$ hydroxide precursor is less than or equal to 2.0 μm;

(2) blending the $Ni_{1-x-y}Co_xMn_y(OH)_2$ hydroxide precursor, a lithium source, and an optional compound containing element M, then subjecting the mixture to a sintering process, subsequently crushing and sieving the sintered materials to prepare the positive electrode material $Li_{1+a}Ni_{1-x-y}Co_xMn_yO_2$ or $Li_{1+a}Ni_{1-x-y-z}Co_xMn_yM_zO_2$.

A third aspect the present disclosure provides a lithium ion battery comprising the aforementioned positive electrode material.

Due to the aforementioned technical schemes, the present disclosure produces the favorable effects as follows:

(1) the positive electrode material of the present disclosure significantly increases the contact area of the positive electrode material with the electrolyte, shortens the diffusion path of Li t, reduces the impedance of the positive electrode material, and improves the power performance of the positive electrode material;

(2) the positive electrode material of the present disclosure can significantly enhance strength of the material particles, such that the cycle performance is greatly improved while maintaining desirable power performance;

(3) the positive electrode material of the present disclosure contains an element M, on the one hand, which significantly enhances the strength of primary particles by improving the structural stability of the bulk phase and inhibiting the generation of microcracks, and on the other hand, which can direct the growth of primary particles in an oriented manner to form multi-chamber supporting structures within the particles, ultimately enhancing strength of the material.

DETAILED DESCRIPTION

Figure 1:
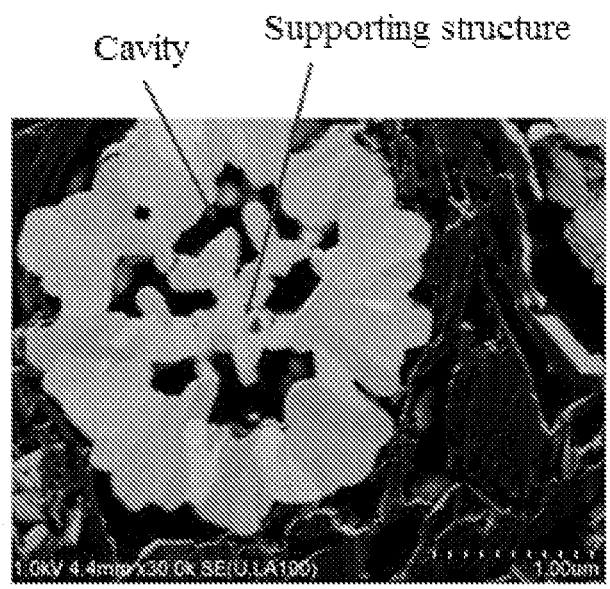
FIG. 1 illustrates a scanning electron Microscopy (SEM) cross-sectional view of the positive electrode material prepared in Example 3 of the present disclosure.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As previously mentioned, a first aspect of the present disclosure provides a positive electrode material having a multi-cavity structure, wherein the positive electrode material is formed by aggregation of a plurality of primary particles, and some of the primary particles grow in an oriented manner to form supporting structures, the supporting structures overlap each other inside the positive electrode material to form a plurality of cavities.

The present inventors have discovered that the positive electrode material of the present disclosure has a plurality of cavities in its interior, can significantly increase the contact area between the positive electrode material and the electrolyte, shortens the diffusion path of $Li^+$ ions, reduces impedance of the positive electrode material, and improves power performance of the positive electrode material; in addition, the positive electrode material has a plurality of cavities in its interior, and supporting structures between the cavities, which significantly increases strength of the positive electrode material particles, and greatly improves the cycle performance while maintaining desirable power performance.

According to the present disclosure, the number of cavities is larger than or equal to 2; preferably, the number of cavities is within a range of 3-12; more preferably, the number of cavities is within a range of 5-7.

According to the present disclosure, the supporting structures have a thickness larger than or equal to 50 nm, and the supporting structures have a length within the range of 80-2,000 nm, preferably, the supporting structures have a thickness within the range of 70-800 nm, and the supporting structures have a length within the range of 100-1,500 nm, more preferably, the supporting structures have a thickness within the range of 210-320 nm, and the supporting structures have a length within the range of 830-1,300 nm.

In the present disclosure, the use of cavities and supporting structures with the specific structure, on the one hand, can reduce impedance of the positive electrode material and, on the other hand, may significantly enhance strength of the positive electrode material particles, and also greatly improve the cycle performance.

According to the present disclosure, the composition of the positive electrode material is represented by formula (1);

$$Li_{1+a}Ni_{1-x-y}Co_xMn_yO_2, \qquad \text{formula (1)};$$

wherein −0.8≤a≤0.3, 0<x≤0.5, 0≤y≤0.5;
preferably −0.5≤a≤0.2, 0.15≤x≤0.40, 0.10≤y≤0.40.

According to the present disclosure, it is preferable that the composition of the positive electrode material is represented by formula (2);

$$Li_{1+a}Ni_{1-x-y-z}Co_xMn_yM_zO_2, \qquad \text{formula (2)};$$

wherein 0≤z≤0.1, preferably 0.005≤z≤0.080;
wherein M is one or more selected from the group consisting of La, Cr, Mo, Ca, Fe, Hf, Ti, Zn, Y, Zr, W, Nb, Sm, V, Mg, B, Al, Sr and Ba; preferably, M is one or more selected from the group consisting of W, Mo, Zr, Nb, Ti, Y and Al.

According to the present disclosure, the addition of element M, on the one hand, which enhances the strength of primary particles by improving the structural stability of the bulk phase, inhibiting the generation of microcracks, on the other hand, which can direct the growth of primary particles in an oriented manner to form multi-chamber supporting structures within the particles, ultimately enhancing strength of the material particles.

According to the present disclosure, the positive electrode material has desirable particle strength, the material can retain its original morphology, rather than being fractured and pulverized, after being subjected to a certain pressure. In the present disclosure, it is preferable that the change rate of K90 of the positive electrode material satisfies formula (3):

$$A_{K90}=(K90'-K90)/K90\times100\%\leq50\%, \qquad \text{formula (3)};$$

wherein K90 and K90' denote the K90 particle size distribution of the material before fracturing and after a pressure of 30 kN respectively.

More preferably, $A_{K90} \leq 30\%$, further preferably, $A_{K90} \leq 20\%$.

According to the present disclosure, an incremental amount of the particle size distribution proportion of the positive electrode material satisfied formula (4);

$$\Delta D_{\leq 1} = D_{\leq 1}' - D_{\leq 1} \leq 20\%, \quad \text{formula (4);}$$

wherein $D_{\leq 1}'$ and $D_{\leq 1}$ denote the particle size distribution proportion of the material with a particle size less than 1 μm before fracturing and after a pressure of 30 kN respectively.

More preferably, $\Delta D_{\leq 1} \leq 12\%$; further preferably, $\Delta D_{\leq 1} \leq 10\%$.

A core of the precursor used in the preparation of the positive electrode material in the present disclosure is less than or equal to 2.0 μm. The core is desirably crystallized and has a compact structure of small size; the crystallized fibers constituting the core are coarse, the fibers are stacked with a high density, after the core is added with lithium and sintered, the sintered product is not prone to form a large hollow structure, but can easily form a plurality of cavities supporting structures inside the particles.

A second aspect of the present disclosure provides a method of preparing the aforementioned positive electrode material includes:

(1) mixing an aqueous solution containing soluble salts of Ni, Co and Mn, a complexing agent and a precipitant and subjecting the mixture to a co-precipitation reaction under protection of an inert gas, in order to obtain a $Ni_{1-x-y}Co_xMn_y(OH)_2$ hydroxide precursor; wherein a core of the $Ni_{1-x-y}Co_xMn_y(OH)_2$ hydroxide precursor is less than or equal to 2.0 μm;

(2) blending the $Ni_{1-x-y}Co_xMn_y(OH)_2$ hydroxide precursor, a lithium source, and an optional compound containing element M and then subjecting to a sintering process, subsequently crushing and sieving the sintered materials to prepare the positive electrode material $Li_{1+a}Ni_{1-x-y}Co_xMn_yO_2$ or $Li_{1+a}Ni_{1-x-y-z}Co_xM-n_yM_zO_2$.

The present inventors have discovered that, during the preparation process of the precursor, the crystallization speed and the crystallization orientation of the precursor are controlled by adjusting the rotation speed of synthesis and the concentration of a complexing agent, so that the core of the hydroxide precursor obtained in step (1) is small, specifically, the core refers to a crystal structure with the precursor center less than or equal to 2.0 μm, and the core is desirably crystallized and has a compact structure of small size; the crystallized fibers constituting the core are coarse, the fibers are stacked with a high density, after the core is added with lithium and sintered, the sintered product is not prone to form a large hollow structure, but can easily form a plurality of cavities supporting structures inside the particles.

According to the present disclosure, a diameter $D_{50}$ of the $Ni_{1-x-y}Co_xMn_y(OH)_2$ hydroxide precursor is preferably within a range of 2-8 μm, more preferably, the $D_{50}$ is within a range of 3-8 μm.

According to the present disclosure, the core is preferably within a range of 0.3-2 μm, the core is more preferably within a range of 0.8-1 μm, and the internal crystal structure is a compact structure of small size.

According to the present disclosure, the co-precipitation reaction in step (1) comprises a nucleation phase and a growth phase.

In the present disclosure, the conditions of the nucleation phase comprise a concentration of the complexing agent within a range of 9-20 g/L, a pH within a range of 9-13, a time period of nucleation phase within a range of 1-8 h, a temperature within a range of 30-70° C., and a stirring rate within a range of 60-90 rpm; preferably, a concentration of the complexing agent within a range of 10-18 g/L, a pH within a range of 9.5-13, a time period of nucleation phase within a range of 2-8 h, a temperature within a range of 35-60° C., and a stirring rate within a range of 70-80 rpm.

In the present disclosure, the conditions of the growth phase comprise a concentration of the complexing agent within a range of 10-30 g/L, a pH within a range of 9-13, a time period of nucleation phase within a range of 20-200 h, a temperature within a range of 30-70° C., and a stirring rate within a range of 20-70 rpm; preferably, the conditions of the growth phase comprise a concentration of the complexing agent within a range of 12-25 g/L, a pH within a range of 10-13, a time period of nucleation phase within a range of 25-150 h, a temperature within a range of 35-65° C., and a stirring rate within a range of 25-65 rpm.

According to the present disclosure, the overall reaction time is controlled within a range of 5-200 h.

According to the present disclosure, the inert gas in step (1) is nitrogen gas and/or argon gas.

According to the present disclosure, the method in step (1) further comprises aging, filtering, washing and drying the reactants obtained after the co-precipitation reaction. The aging, filtering, washing and drying process are not specifically limited in the present disclosure, it may be a conventional method well-known among those skilled in the art.

According to the present disclosure, the sintering process in step (2) comprises a temperature rise phase, a thermostatic sintering phase and a cooling phase.

According to the present disclosure, the conditions of the temperature rise phase comprise a temperature rise rate of 0.5-5° C./min, and a time of 2-20 hours; preferably, a temperature rise rate of 0.5-4° C./min, and a time of 5-20 hours.

According to the present disclosure, the conditions of the thermostatic sintering phase comprise a temperature within a range of 600-1,000° C., and a time of 5-30 hours; preferably a temperature within a range of 630-980° C., and a time of 5-25 hours; more preferably, a temperature within a range of 805-900° C., and a time of 15-18 hours.

According to the present disclosure, the sintering temperature in step (2) is within a range of 600-1,000° C., and the sintering atmosphere is one of dry air or oxygen gas or both, an overall sintering time is within a range of 5-30 h.

According to the present disclosure, the complexing agent is one or more selected from the group consisting of ammonium sulfate, ammonium nitrate and aqueous ammonia.

According to the present disclosure, the precipitant is sodium hydroxide and/or potassium hydroxide.

According to the present disclosure, the compound containing element M is one or more selected from the group consisting of an oxide, a nitrate, a sulfate and a chloride of the element M.

According to the present disclosure, the lithium source is one or more selected from the group consisting of lithium carbonate, lithium hydroxide and lithium nitrate.

According to a particularly preferred embodiment of the present disclosure, the method of preparing the positive electrode material includes:

(1) preparing an aqueous solution of soluble salts of Ni, Co and Mn with a certain concentration and then adding the aqueous solution into a stirred reaction tank with a precipitant and a complexing agent respectively, maintaining a certain reaction temperature, in order to obtain a $Ni_{1-x-y}Co_xMn_y(OH)_2$ hydroxide precursor through co-precipitation under the protection of an inert gas;

(2) blending the obtained hydroxide precursor obtained with a lithium source and a compound containing an element M uniformly, and placing the mixture in an atmospheric furnace for sintering, subsequently crushing and sieving the sintered materials to prepare the positive electrode material $Li_{1+a}Ni_{1-x-y-z}Co_xM-n_yM_zO_2$.

A third aspect the present disclosure provides a lithium ion battery, wherein the lithium ion battery comprises the aforementioned positive electrode material.

In the present disclosure, the lithium ion battery is preferably a button cell, more preferably a 2025 type button cell.

Specifically, the method of preparing a button cell in the present disclosure includes:

(1) Positive Electrode Pole Piece:

firstly, 9.2 mg of the positive electrode material, 0.5 mg of acetylene black and 0.3 mg of polyvinylidene fluoride (PVDF) were mixed, the mixture was coated on an aluminum foil and subjected to the drying process, and subjected to press forming under a pressure of 100 Mpa to a positive electrode pole piece with a diameter of 12 mm and a thickness of 120 μm, the positive electrode sheet pole piece was subsequently placed in a vacuum drying oven and dried at 120° C. for 12 h.

(2) Negative Electrode Pole Piece:

the negative electrode was a Li metal sheet having a diameter of 17 mm and a thickness of 1 mm; the separator was a polyethylene porous membrane having a thickness of 25 μm, the electrolyte was a mixed liquor containing ethylene carbonate (EC) and diethyl carbonate (DEC) in an equivalent amount and using 1 M of $LiPF_6$ as an electrolyte.

(3) Assembly:

the positive electrode pole piece, separator, negative electrode pole piece and electrolyte were then assembled into a 2025 type button cell in an Ar gas glove box with both water content and oxygen content less than 5 ppm.

The present disclosure will be described in detail with reference to examples.

In the following examples and comparative examples:

1) the initial specific discharge capacity was measured after placing the fabricated button cell for 24 hours and the open circuit voltage was stabilized, the positive electrode of the button cell was charged with a current density of 20 mA/g to a cut-off voltage of 4.3V, constant voltage charge was performed at 4.3V for 30 min, then discharged the button cell to a cut-off voltage of 3.0V at the same current density, the charge-discharge cycle was then performed once more according to the same manner, the button cell in the meanwhile was regarded as an activated cell.

2) the cycle performance test method was as follows: the activated cell was used, the charge-discharge cycle was performed for 80 cycles with a current density of 2 C within the voltage range of 3.0-4.3V at a temperature of 45° C., the high-temperature capacity retention ratio of the material was measured.

3) the rate capability test method was as follows: the rate capability of the battery was tested using the activated cell, which was charged with a current density of 20 mA/g (0.1 C) within the voltage range of 3.0-4.3V, and then discharged with a current density of 40 mA/g (0.2 C), 100 mA/g (0.5 C), 200 mA/g (1 C), 400 mA/g (2 C), 1,000 mA/g (5 C), 2,000 mA/g (10 C), respectively.

The impedance performance test method was as follows: an activated cell was used, the impedance of the cell was tested by the HPPC test method at 25° C. and the current of 3 C at 10-90% SOC, respectively.

Example 1

The Example served to illustrate a positive electrode material prepared with the method of the present disclosure.

(1) a mixed solution with a concentration of 1.5 mol/L comprising nickel sulfate, cobalt sulfate and manganese sulfate in a molar ratio of 0.33:0.33:0.34 was prepared, the mixed solution, a complexing agent aqueous ammonia solution, and a precipitant sodium hydroxide solution were fed into a reaction kettle, and nitrogen gas was introduced as a protecting gas, the ammonia concentration was controlled to 10 g/L, the pH was controlled to 12.0, the rotational speed was controlled to 70 rpm, the conditions were maintained for 3 h, the growth of core was completed, the core was 0.9 μm, the crystal structure of the core was a compact structure of small size; the ammonia content was then raised to 16 g/L, the pH was lowered to 11.5, the rotational speed was decreased to 55 rpm, the conditions were maintained until a dimension $D_{50}$ of the particles was grown to 4.0 μm, the reaction was then stopped; the reactants were subjected to aging, washing and drying to obtain a precursor $Ni_{0.33}Co_{0.33}Mn_{0.34}(OH)_2$, wherein an internal crystal structure of the precursor was a compact structure of small size;

(2) the precursor and lithium carbonate were blended in a molar ratio of 1:1.1, the mixture was placed in an atmosphere furnace, and subjected to sintering in an air atmosphere; wherein the sintering process comprised: the temperature was raised from 25° C. to 900° C. for 10 h, and the temperature was then maintained at 900° C. for 15 h, followed by naturally cooling to room temperature; the material was subjected to crushing and screening to obtain a high power positive electrode material $LiNi_{0.33}Co_{0.33}Mn_{0.34}O_2$ having multi-cavity supporting structures.

As illustrated by the SEM cross-sectional schematic view, the number c of cavities was 5, the average thickness w of the supporting structures was 210 nm, and the average length L of the supporting structures was 830 nm.

Example 2

The Example served to illustrate a positive electrode material prepared with the method of the present disclosure.

(1) a mixed solution with a concentration of 1.5 mol/L comprising nickel sulfate, cobalt sulfate and manganese sulfate in a molar ratio of was prepared, the mixed solution, a complexing agent aqueous ammonia solution, and a precipitant sodium hydroxide solution were fed into a reaction kettle, and nitrogen gas was introduced as a protecting gas, the ammonia concentration was controlled to 10 g/L, the pH was controlled to 12.0, the rotational speed was controlled to 70 rpm, the conditions were maintained for 3 h, the growth of core was completed, the core was 0.8 μm, the crystal structure of said core was a compact structure of small size; the ammonia content was then raised to 16 g/L, the pH was lowered to 11.5, the rotational speed was decreased to 55 rpm, the conditions were maintained until a dimension $D_{50}$ of the particles was grown to 4.0 μm, the reaction was then stopped; the reactants were subjected to aging, washing and drying to obtain a precursor $Ni_{0.5}Co_{0.2}Mn_{0.3}(OH)_2$, wherein an internal crystal structure of the precursor was a compact structure of small size;

(2) the precursor and lithium carbonate were blended in a molar ratio of 1:1.1, the mixture was placed in an atmosphere furnace, and subjected to sintering in an air atmosphere; wherein the sintering process comprised: the temperature was raised from 25° C. to 860° C. for 10 h, and the temperature was then maintained at 860° C. for 15 h, followed by naturally cooling to room temperature; the material was subjected to crushing and screening to obtain a high power positive electrode material $LiNi_{0.5}Co_{0.2}Mn_{0.3}O_2$ having multi-cavity supporting structures.

As illustrated by the SEM cross-sectional schematic view, the number c of cavities was 7, the average thickness w of the supporting structures was larger than or equal to 270 nm, and the average length L of the supporting structures was 1,200 nm.

Example 3

The Example served to illustrate a positive electrode material prepared with the method of the present disclosure.

(1) a mixed solution with a concentration of 1.5 mol/L comprising nickel sulfate, cobalt sulfate and manganese sulfate in a molar ratio of 0.55:0.15:0.30 was prepared, the mixed solution, a complexing agent aqueous ammonia solution, and a precipitant sodium hydroxide solution were fed into a reaction kettle, and nitrogen gas was introduced as a protecting gas, the ammonia concentration was controlled to 10 g/L, the pH was controlled to 12.0, the rotational speed was controlled to 70 rpm, the conditions were maintained for 3 h, the growth of core was completed, the core was 1.1 µm, the crystal structure of said core was a compact structure of small size; the ammonia content was then raised to 16 g/L, the pH was lowered to 11.5, the rotational speed was decreased to 55 rpm, the conditions were maintained until a dimension $D_{50}$ of the particles was grown to 4.0 µm, the reaction was then stopped; the reactants were subjected to aging, washing and drying to obtain a precursor $Ni_{0.55}Co_{0.15}Mn_{0.3}(OH)_2$, wherein an internal crystal structure of the precursor was a compact structure of small size;

(2) the precursor and lithium carbonate were blended in a molar ratio of 1:1.1, the mixture was placed in an atmosphere furnace, and subjected to sintering in an air atmosphere; wherein the sintering process comprised: the temperature was raised from 25° C. to 850° C. for 10 h, and the temperature was then maintained at 850° C. for 15 h, followed by naturally cooling to room temperature; the material was subjected to crushing and screening to obtain a high power positive electrode material $LiNi_{0.55}Co_{0.15}Mn_{0.3}O_2$ having multi-cavity supporting structures.

FIG. 1 illustrated a SEM cross-sectional view of the positive electrode material prepared in Example 3 of the present disclosure; as can be seen from FIG. 1, the number c of cavities was 6, the average thickness w of the supporting structures was larger than or equal to 320 nm, and the average length L of the supporting structures was 960 nm.

Figure 4:
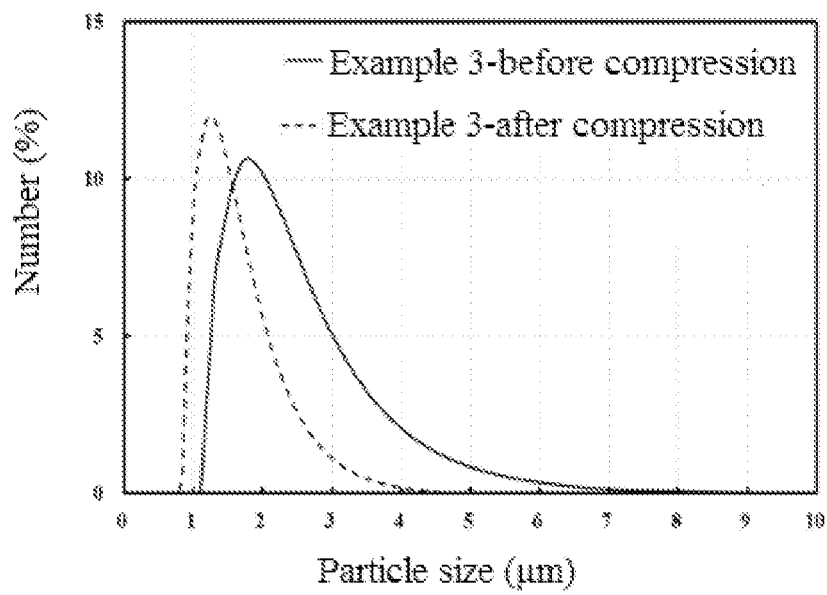
FIG. 4 is a schematic diagram showing the quantity distribution of the positive electrode material prepared in Example 3 of the present disclosure before and after the pressure of 30 kN.

In addition, FIG. 4 was a schematic diagram showing the quantity distribution of the positive electrode material prepared in Example 3 of the present disclosure before and after the pressure of 30 kN; as can be seen from FIG. 4, the distribution of the particle size of the material before and after the fracturing process did not change significantly, it demonstrated that the supporting structures mentioned in the present disclosure played a positive role in maintaining the structural stability of the material.

Example 4

The Example served to illustrate a positive electrode material prepared with the method of the present disclosure.

(1) a mixed solution with a concentration of 1.5 mol/L comprising nickel sulfate, cobalt sulfate and manganese sulfate in a molar ratio of 0.55:0.15:0.30 was prepared, the mixed solution, a complexing agent aqueous ammonia solution, and a precipitant sodium hydroxide solution were fed into a reaction kettle, and nitrogen gas was introduced as a protecting gas, the ammonia concentration was controlled to 10 g/L, the pH was controlled to 12.0, the rotational speed was controlled to 70 rpm, the conditions were maintained for 3 h, the growth of core was completed, the core was 1.0 µm, the crystal structure of said core was a compact structure of small size; the ammonia content was then raised to 16 g/L, the pH was lowered to 11.5, the rotational speed was decreased to 55 rpm, the conditions were maintained until a dimension $D_{50}$ of the particles was grown to 4.0 µm, the reaction was then stopped; the reactants were subjected to aging, washing and drying to obtain a precursor $Ni_{0.55}Co_{0.15}Mn_{0.3}(OH)_2$, wherein an internal crystal structure of the precursor was a compact structure of small size;

(2) the precursor, lithium carbonate and tungsten oxide were blended in a molar ratio of 1:1.1:0.005, the mixture was placed in an atmosphere furnace, and subjected to sintering in an air atmosphere; wherein the sintering process comprised: the temperature was raised from 25° C. to 850° C. for 10 h, and the temperature was then maintained at 850° C. for 15 h, followed by naturally cooling to room temperature; the material was subjected to crushing and screening to obtain a high power positive electrode material $LiNi_{0.545}Co_{0.15}Mn_{0.3}W_{0.005}O_2$ having multi-cavity supporting structures.

As illustrated by the SEM cross-sectional schematic view, the number c of cavities was 5, the average thickness w of the supporting structures was 270 nm, and the average length L of the supporting structures was 1,300 nm.

Example 5

The Example served to illustrate a positive electrode material prepared with the method of the present disclosure.

The positive electrode material was prepared according to the same method as in Example 4, except that:

in step (2), the precursor, lithium carbonate and zirconium oxide were blended in a molar ratio of 1:1.1:0.005, the mixture was placed in an atmosphere furnace, and subjected to sintering in an air atmosphere; wherein the sintering process comprised: the temperature was raised from 25° C. to 850° C. for 12 h, and the temperature was then maintained at 850° C. for 18 h, followed by naturally cooling to room temperature; the material was subjected to crushing and screening to obtain a high power positive electrode material $LiNi_{0.545}Co_{0.15}Mn_{0.3}Zr_{0.005}O_2$ having multi-cavity supporting structures.

As illustrated by the SEM cross-sectional schematic view, the number c of cavities was 7, the average thickness w of the supporting structures was 270 nm, and the average length L of the supporting structures was 1,100 nm.

Example 6

The Example served to illustrate a positive electrode material prepared with the method of the present disclosure.

The positive electrode material was prepared according to the same method as in Example 4, except that:

in step (2), the precursor, lithium carbonate and niobium oxide were blended in a molar ratio of 1:1.1:0.005, the mixture was placed in an atmosphere furnace, and subjected to sintering in an air atmosphere; wherein the sintering process comprised: the temperature was raised from to 845° C. for 15 h, and the temperature was then maintained at 845° C. for 15 h, followed by naturally cooling to room temperature; the material was subjected to crushing and screening to obtain a high power positive electrode material $LiNi_{0.545}Co_{0.15}Mn_{0.3}Nb_{0.005}O_2$ having multi-cavity supporting structures.

As illustrated by the SEM cross-sectional schematic view, the number c of cavities was 6, the average thickness w of the supporting structures was 310 nm, and the average length L of the supporting structures was 970 nm.

Example 7

The Example served to illustrate a positive electrode material prepared with the method of the present disclosure.

The positive electrode material was prepared according to the same method as in Example 4, except that:

in step (2), the precursor, lithium carbonate and titanium oxide were blended in a molar ratio of 1:1.1:0.005, the mixture was placed in an atmosphere furnace, and subjected to sintering in an air atmosphere; wherein the sintering process comprised: the temperature was raised from 25° C. to 840° C. for 12 h, and the temperature was then maintained at 840° C. for 17 h, followed by naturally cooling to room temperature; the material was subjected to crushing and screening to obtain a high power positive electrode material $LiNi_{0.545}Co_{0.15}Mn_{0.3}Ti_{0.005}O_2$ having multi-cavity supporting structures.

As illustrated by the SEM cross-sectional schematic view, the number c of cavities was 7, the average thickness w of the supporting structures was 290 nm, and the average length L of the supporting structures was 950 nm.

Comparative Example 1

(1) a mixed solution with a concentration of 1.5 mol/L comprising nickel sulfate, cobalt sulfate and manganese sulfate in a molar ratio of 0.55:0.15:0.30 was prepared, the mixed solution, a complexing agent aqueous ammonia solution, and a precipitant sodium hydroxide solution were fed into a reaction kettle, and nitrogen gas was introduced as a protecting gas, the ammonia concentration was controlled to 8 g/L, the pH was controlled to 12.0, the rotational speed was controlled to 50 rpm, the conditions were maintained for 10 h, the growth of core was completed, the core was 2.5 µm, the ammonia content was then raised to 16 g/L, the pH was lowered to 11.5, the rotational speed was 50 rpm, the conditions were maintained until a dimension $D_{50}$ of the particles was grown to 4.0 µm, the reaction was then stopped; the reactants were subjected to aging, washing and drying to obtain a precursor $Ni_{0.55}Co_{0.15}Mn_{0.3}(OH)_2$, wherein an internal crystal structure of the precursor was a loose structure; as compared with the Example 3, the Comparative Example 1 had the lower ammonia concentration and rotation speed during the precursor nucleation phase, it caused that the precursor core had poor crystallization and a relatively loose structure; the nucleation phase was long, it resulted in that the loose core had a large core;

(2) the precursor and lithium carbonate were blended in a molar ratio of 1:1.1, the mixture was placed in an atmosphere furnace, and subjected to sintering in an air atmosphere; wherein the sintering process comprised: the temperature was raised from 25° C. to 830° C. for 10 h, and the temperature was then maintained at 830° C. for 15 h, followed by naturally cooling to room temperature; the material was subjected to crushing and screening to obtain a high power positive electrode material $LiNi_{0.55}Co_{0.15}Mn_{0.3}O_2$ having a hollow structure. Since the core structure of the precursor was relatively loose, the precursor was not easy to keep a native crystalline structure during the sintering process with lithium, but the precursor was prone to melt and shrink, and finally forming a large hollow structure inside the positive electrode material.

Figure 2:
FIG. 2 illustrates a SEM cross-sectional view of the positive electrode material prepared in Comparative Example 1 of the present disclosure.

In addition, FIG. 2 illustrated a SEM cross-sectional view t of the positive electrode material prepared in Comparative Example 1 of the present disclosure; FIG. 2 showed that the interior of the positive electrode material was a hollow structure.

Figure 3:
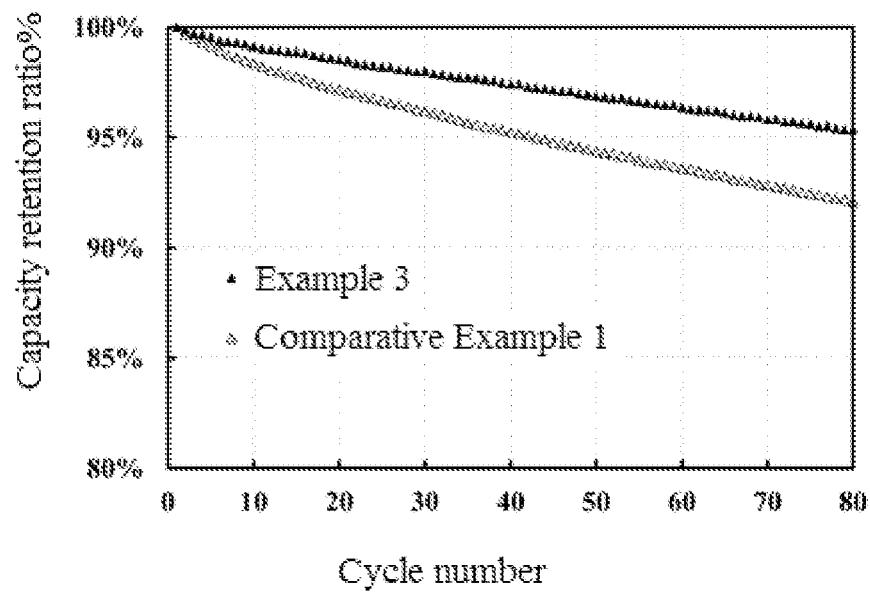
FIG. 3 illustrates a graph comparing the cycle performances of the positive electrode material prepared in Example 3 and Comparative Example 1 of the present disclosure.

Moreover, FIG. 3 illustrated a graph comparing the cycle performances of the positive electrode material prepared in Example 3 and Comparative Example 1 of the present disclosure, wherein 4.3V-3.0V @45° C., 2 C/2 C indicated the conditions of cell cycle comprised that the temperature was 45° C., the voltage was within a voltage range of 4.3V-3.0V, both the charge current and the discharge current were 2 C, the high-temperature cycle capacity retention ratio of Example 3 was significantly improved, it demonstrated that the multi-cavity supporting structures mentioned in the present disclosure played a positive role for maintaining structural stability of the material and the improving service life of the material.

Figure 5:
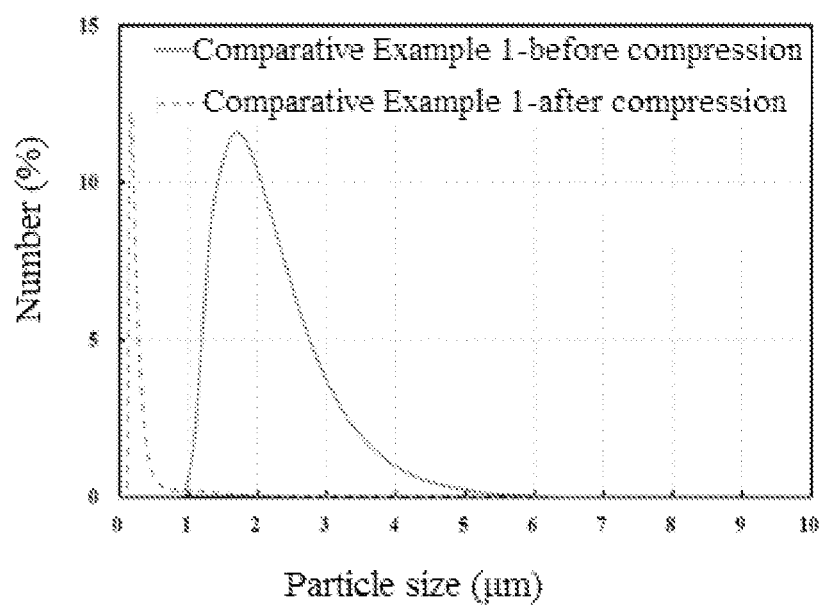
FIG. 5 is a schematic diagram showing the quantity distribution of the positive electrode material prepared in Comparative Example 1 of the present disclosure before and after the pressure of 30 kN.

Further, FIG. 5 was a schematic diagram showing the quantity distribution of the positive electrode material prepared in Comparative Example 1 of the present disclosure before and after the pressure of 30 kN, as illustrated by FIG. 5, the distribution of the particle size of the positive electrode material before and after the fracturing process changed significantly, and a large amount of fine powder was generated in the material following the fracturing process; furthermore, the positive electrode material with a hollow structure had poor structural strength.

Test Example 1

The properties of the positive electrode materials prepared in Examples and Comparative Example were tested, the results were shown in Table 1.

TABLE 1

| Serial number | Composition of positive electrode active material | Rate, 10 C/1 C | First specific discharge capacity, mAh/g | High-temperature capacity retention ratio | 50% SOC impedance/Ω |
|---|---|---|---|---|---|
| Example 1 | $LiNi_{0.33}Co_{0.33}Mn_{0.34}O_2$ | 91.5% | 166.2 | 97.3% | 5.7 |
| Example 2 | $LiNi_{0.5}Co_{0.2}Mn_{0.3}O_2$ | 90.3% | 177.5 | 96.2% | 6.3 |
| Example 3 | $LiNi_{0.55}Co_{0.15}Mn_{0.3}O_2$ | 91.1% | 182.8 | 95.4% | 6.1 |
| Example 4 | $LiNi_{0.545}Co_{0.15}Mn_{0.3}W_{0.005}O_2$ | 92.3% | 183.1 | 96.5% | 5.5 |
| Example 5 | $LiNi_{0.545}Co_{0.15}Mn_{0.3}Zr_{0.005}O_2$ | 91.9% | 182.6 | 97.0% | 6.0 |
| Example 6 | $LiNi_{0.545}Co_{0.15}Mn_{0.3}Nb_{0.005}O_2$ | 92.0% | 182.0 | 96.3% | 5.9 |
| Example 7 | $LiNi_{0.545}Co_{0.15}Mn_{0.3}Ti_{0.005}O_2$ | 92.0% | 182.8 | 96.9 | 6.2 |
| Comparative Example 1 | $LiNi_{0.55}Co_{0.15}Mn_{0.3}O_2$ | 91.2% | 183.0 | 92.1% | 7.2 |

As illustrated in Table 1, the positive electrode material having a multi-cavity structure prepared with the method of the present disclosure exhibits significantly improved high-temperature cycle capacity retention ratio and reduced impedance under the circumstance of similar rates, compared to the positive electrode material having the same nickel-cobalt-manganese ratio and a hollow structure, it demonstrate that the multi-cavity supporting structures mentioned by the present disclosure play a positive role on maintaining structural stability of the material and improving service life of the material. Additionally, the doping of the elements W, Zr, Nb and Ti can further improve the rate capability, cycle stability and impedance performance of the material.

Test Example 2

The positive electrode materials prepared in the Examples 1-7 and Comparative Examples 1 were placed in a powder compaction tester, a pressure of 30 kN was applied, the particle size distribution of the samples before and after compaction was then tested separately by using a Malvern Laser Particle Size Analyzer to obtain the data shown in the following table:

TABLE 2

| | Before compression | | After compression | | | |
|---|---|---|---|---|---|---|
| Serial number | K90 | $D_{\leq 1}$ | K90' | $D_{\leq 1}'$ | $A_{K90}$ | $\Delta D_{\leq 1}$ |
| Example 1 | 1.30 | 0 | 1.55 | 8.0% | 19.2% | 8.0% |
| Example 2 | 1.25 | 0 | 1.51 | 8.5% | 20.8% | 8.5% |
| Example 3 | 1.29 | 0 | 1.49 | 4.9% | 15.5% | 4.9% |
| Example 4 | 1.31 | 0 | 1.53 | 5.5% | 16.8% | 5.5% |
| Example 5 | 1.35 | 0 | 1.58 | 7.1% | 17.0% | 7.1% |
| Example 6 | 1.20 | 0 | 1.45 | 8.7% | 20.8% | 8.7% |
| Example 7 | 1.16 | 0 | 1.49 | 10.3% | 28.5% | 10.3% |
| Comparative Example 1 | 1.00 | 0 | 1.86 | 31.5% | 86.0% | 31.5% |

As shown in Table 2, the positive electrode material having multi-cavity supporting structures prepared with the method of the present disclosure has a smaller change in particle size distribution, produces less fine powders and exhibits larger particle strength after applying a pressure of 30 kN than the positive electrode material having the same nickel-cobalt-manganese ratio and a hollow structure.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A positive electrode material having a multi-cavity structure, wherein the positive electrode material is formed by aggregation of a plurality of primary particles, and a part of the primary particles grow in an oriented manner to form supporting structures, the supporting structures overlapping each other inside the positive electrode material to form a plurality of cavities;
   wherein a number of the plurality of cavities inside the positive electrode material is within a range of 3-12; and
   wherein a composition of the positive electrode material is represented by formula (2):

$$Li_{1+a}Ni_{1-x-y-z}Co_xMn_yM_zO_2, \qquad \text{formula(2)},$$

wherein $-0.8 \leq a \leq 0.3$, $0 < x \leq 0.5$, $0 \leq y \leq 0.5$, and $0 \leq z \leq 0.1$; and
   wherein M is one or more selected from the group consisting of La, Cr, Mo, Ca, Fe, Hf, Ti, Zn, Y, Zr, W, Nb, Sm, V, Mg, B, Al, Sr, and Ba,
   wherein the supporting structures have a thickness within a range of 70-800 nm, and the supporting structures have a length within a range of 100-1,500 nm;
   wherein a change rate of K90 of the positive electrode material satisfies formula (3):

$$A_{K90}=(K90'-K90)/K90 \times 100\% \leq 50\%, \qquad \text{formula (3)};$$

wherein K90 and K90' each denote the K90 particle size distribution of the positive electrode material before and after applying a pressure of 30 kN to the positive electrode material, respectively;
   and/or,
   an incremental amount of a particle size distribution proportion of the positive electrode material satisfies formula (4);

$$\Delta D_{\leq 1}=D_{\leq 1}'-D_{\leq 1} \leq 20\%, \qquad \text{formula (4)};$$

wherein $D_{\leq 1}'$ and $D_{\leq 1}$ each denote the particle size distribution proportion of the positive electrode material with a particle size less than 1 μm before and after applying a pressure of 30 kN to the positive electrode material, respectively.

2. The positive electrode material of claim 1, wherein $-0.5 \leq a \leq 0.2$, $0.10 \leq x \leq 0.40$, and $0.10 \leq y \leq 0.40$.

3. The positive electrode material of claim 1, wherein $0.005 \leq z \leq 0.080$; and
   wherein M is one or more selected from the group consisting of W, Mo, Zr, Nb, Ti, Y, and Al.

4. A method of preparing the positive electrode material of claim 1, comprising:
   (1) mixing an aqueous solution containing soluble salts of Ni, Co and Mn, a complexing agent and a precipitant, and subjecting the mixture to a co-precipitation reaction under the protection of an inert gas, in order to obtain a $Ni_{1-x-y}Co_xMn_y(OH)_2$ hydroxide precursor comprising a core at center thereof, wherein a size of the core of the $Ni_{1-x-y}Co_xMn_y(OH)_2$ hydroxide precursor is less than or equal to 2.0 µm;
   wherein the co-precipitation reaction comprises a nucleation phase and a growth phase;
   wherein conditions of the nucleation phase comprise: a concentration of complexing agent within a range of 10-18 g/L, the pH within a range of 9.5-13, a time period of nucleation phase within a range of 2-8 h, a temperature within a range of 35-60° C., and a stirring rate within a range of 70-80 rpm;
   wherein conditions of the growth phase comprise: the concentration of complexing agent within a range of 12-25 g/L, the pH within a range of 10-13, a time period of growth phase within a range of 25-150 h, a temperature within a range of 35-65° C., and a stirring rate within a range of 25-65 rpm; and
   (2) blending the $Ni_{1-x-y}Co_xMn_y(OH)_2$ hydroxide precursor, a lithium source, and an optional compound containing element M to obtain a mixture, then subjecting the mixture to a sintering process to obtain a sintered material, subsequently crushing and sieving the sintered materials to prepare the positive electrode material $Li_{1+a}Ni_{1-x-y}Co_xMn_yO_2$ or $Li_{1+a}Ni_{1-x-y-z}Co_xMn_yM_zO_2$.

5. The method of claim 4, wherein the size of the core of the $Ni_{1-x-y}Co_xMn_y(OH)_2$ hydroxide precursor is within a range of 0.8-1 µm; and/or
   wherein a diameter D50 of the $Ni_{1-x-y}Co_xMn_y(OH)_2$ hydroxide precursor is within a range of 2-8 µm.

6. The method of claim 5, wherein the complexing agent is one or more selected from the group consisting of ammonium sulfate, ammonium nitrate, and aqueous ammonia; and/or
   wherein the precipitant is sodium hydroxide and/or potassium hydroxide; and/or,
   wherein the compound containing element M is one or more selected from the group consisting of an oxide, a nitrate, a sulfate, and a chloride of the element M; and/or
   wherein the lithium source is one or more selected from the group consisting of lithium carbonate, lithium hydroxide, and lithium nitrate.

7. The method of claim 4, wherein the sintering process in step (2) comprises a temperature rise phase, a thermostatic sintering phase and a cooling phase.

8. The method of claim 7, wherein conditions of the temperature rise phase comprise a temperature rise rate of 0.5-5° C./min, and a time of 2-20 hours.

9. The method of claim 7, wherein conditions of the thermostatic sintering phase comprise a temperature within a range of 600-1,000° C., and a time of 5-30 hours.

10. A lithium ion battery comprising the positive electrode material of claim 1.

* * * * *